United States Patent [19]

Compton

[11] 4,003,330
[45] Jan. 18, 1977

[54] MARINE ENGINE MOUNT

[75] Inventor: Jack Bernard Spencer Compton, Crawley, England

[73] Assignee: Silentbloc Limited, Crawley, England

[22] Filed: Oct. 2, 1975

[21] Appl. No.: 618,820

[30] Foreign Application Priority Data

Oct. 3, 1974  United Kingdom ............ 42962/74

[52] U.S. Cl. ................................. 115/.5 B; 248/3; 248/9

[51] Int. Cl.² ......................................... B63H 21/30

[58] Field of Search ............. 115/34 R, .5 B; 248/3, 248/5, 6, 7, 8, 21, 23; 244/54; 403/221, 225, 226, 228

[56] References Cited

UNITED STATES PATENTS

| | | |
|---|---|---|
| 1,761,973 | 6/1930 | Daubner ................................ 248/6 |
| 2,823,882 | 2/1958 | Ross ................................... 248/21 |
| 3,399,647 | 9/1968 | Alexander, Jr. et al. ........ 115/34 R |

*Primary Examiner*—Trygve M. Blix
*Assistant Examiner*—Sherman D. Basinger
*Attorney, Agent, or Firm*—Oblon, Fisher, Spivak, McClelland & Maier

[57] ABSTRACT

A marine engine is supported by four flexible mountings each comprising a rigid inner member, connected to the engine, a flexible layer around the inner member, an outer member surrounding the flexible layer, and a support connected to an engine bearer in a boat, the support having opposed walls between which the outer member is located, and clamping devices for clamping the outer member to the support in various positions along the opposed walls.

5 Claims, 4 Drawing Figures

MARINE ENGINE MOUNT

BACKGROUND OF THE INVENTION

This invention relates to flexible mountings and marine installations incorporating such mountings.

Many complicated methods are used to mount boat and ship engines. In many cases the engine is supported directly on ship bearers so that the space between the bearers is not employed. It is desirable to produce a mounting having a very low profile for example for use in a marine cabin cruiser or yacht where it is desired to achieve an extremely low engine height in order that maximum height be available above the engine, for example for cabin or other accommodation. In many prior art proposals the type of bracket used makes it necessary to cut holes in bearers which may weaken important structural sections of the hull.

SUMMARY OF THE INVENTION

According to the present invention a flexible mounting has a rigid inner member, an intermediate flexible layer formed in at least one part and positioned around the inner member, an outer member surrounding the flexible layer, a support having opposed parallel walls between which the outer member is located, and clamping means for clamping the outer member to the support in various positions along the parallel walls.

The clamping means may include a pair of clamping devices one on each of the parallel walls and a third clamping device on a further wall which bridges the parallel walls and which extends perpendicular thereto. For example each clamping device may comprise a threaded stud secured to the outer member and passing through a slot in the support and carrying a nut engaging the support.

According to a specific aspect of the present invention a marine installation comprises a boat having at least one engine bearer, and an engine mounted on the bearer by means of a number of spaced flexible mountings each of which has a rigid inner member connected to the engine, an intermediate flexible layer formed in at least one part and positioned around the inner member, an outer member surrounding the flexible layer, a support having opposed parallel walls between which the outer member is received, and clamping means for clamping the outer member to the support in various positions along the parallel walls.

According to a further aspect of the present invention a marine installation comprises a boat having at least one engine bearer and an engine mounted on the bearer by means of a number of spaced flexible mountings each of which includes a rigid support including a pair of spaced substantially vertical walls connected by lower integral portions thereof to the engine bearer, upper parts of the vertical walls being interconnected by an integral substantially horizontal wall, each of the vertical and horizontal walls having a hole therein and each of the vertical and horizontal walls having an outer and an inner face around the margin of said hole, a rigid outer sleeve disposed in abutting relation to said inner faces of the vertical walls, said outer sleeve having an inner contact surface, three threaded studs being carried by the rigid outer sleeve and extending one through each of said holes, a nut carried by each of the studs and bearing against said outer faces of said walls, an intermediate flexible layer in contact with said inner contact surface of the rigid outer sleeve, and a rigid inner member connected to the engine and located within said intermediate flexible layer.

DESCRIPTION OF SPECIFIC EMBODIMENT

Figure 1:
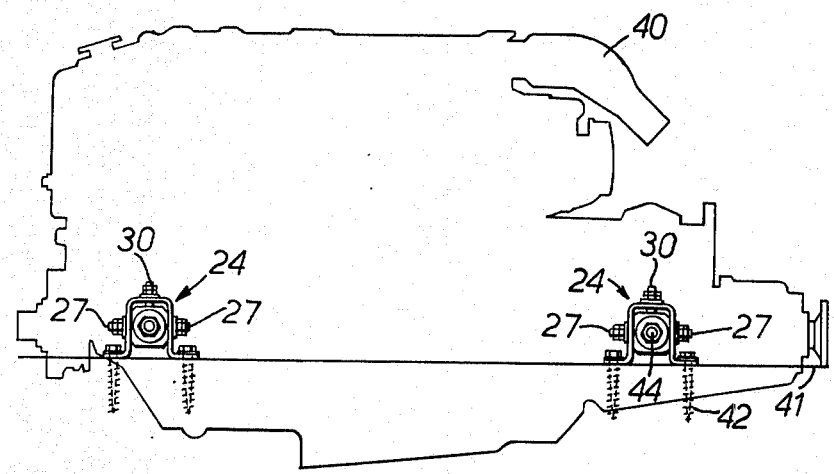
FIG. 1 is an elevation of a marine engine supported in accordance with the present invention.
Figure 4:
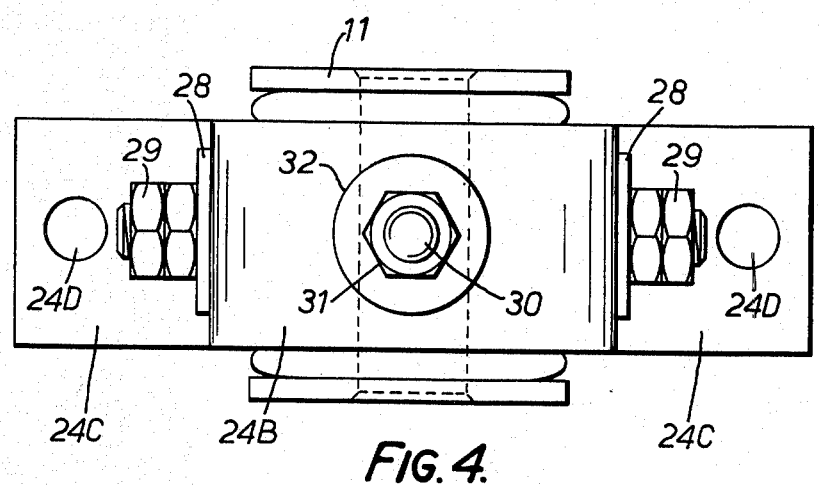
FIG. 4 is a plan view of the mounting of FIGS. 2 and 3.

FIG. 1 shows in outline a marine engine 40 which is positioned between a pair of bearers in a boat of which one bearer 41 is shown. The boat is secured to the bearers by four flexible mountings of which two are shown and generally indicated at 24.

Figure 2:
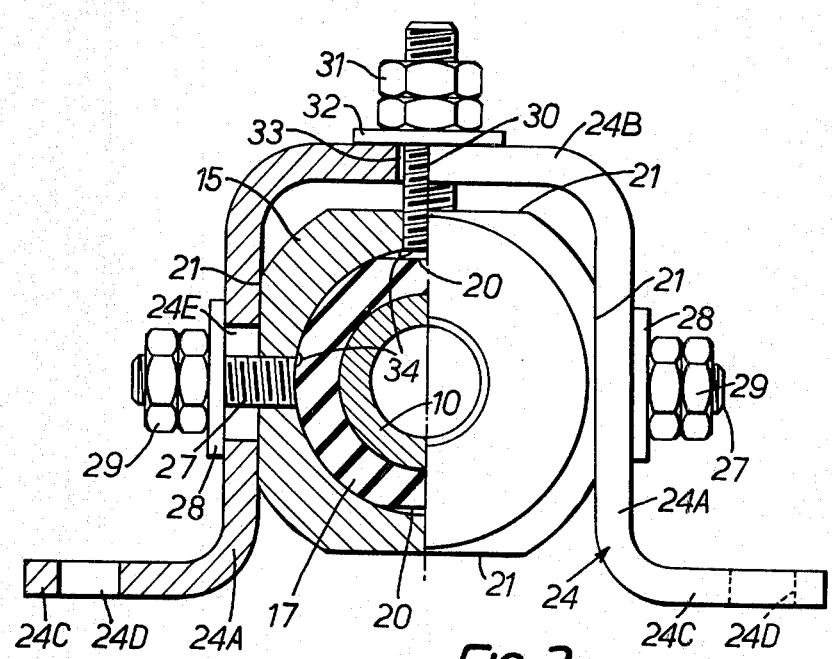
FIG. 2 is a part sectional end elevation of an engine mounting utilised in FIG. 1.
Figure 3:
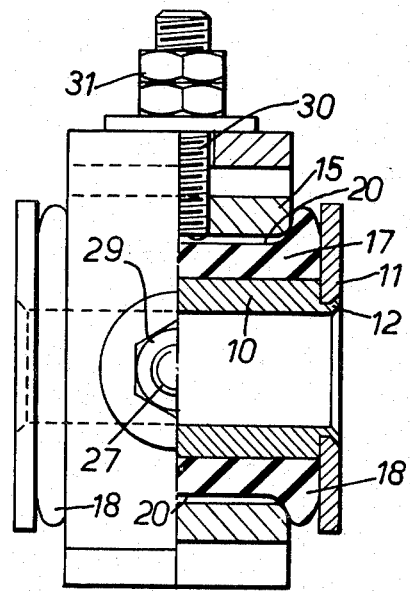
FIG. 3 is a part sectional side elevation of the mounting of FIG. 2.

As shown in FIGS. 2 and 3 each flexible mounting 24 includes a metallic inner sleeve 10 having end flanges 11 peened thereto at 12. Surrounding the inner sleeve 10 is a rigid outer member 15. The outer member is spaced from the sleeve 10 and in the space is received a rubber sleeve 17 having end flanges 18 positioned between the periphery of the end flanges 11 and the ends of the outer member 15. The rubber sleeve 17 may, for example, be bonded to the surface of the inner sleeve 10 but lie under compression with simple frictional contact with the majority of the internal surface of the outer member 15. Alternatively, the rubber member may be bonded to both inner and outer members. As shown in FIGS. 2 and 3, the rubber sleeve 17 is provided with a pair of reliefs or flats 20 at diametrically opposite points at positions which are intended to be top and bottom positions when assembled for supporting the marine engine 40. The outer periphery of the outer member 15 is basically circular but it is cut away to provide four flats 21 at 90° intervals.

The mounting so far described is received within a U-shaped bracket having vertical limbs 24A connected at their upper ends by a horizontal bridge 24B. The limbs 24A have horizontal outwardly turned flanges 24C each provided with a hole 24D for a mounting 42 (see FIG. 1). As shown in FIG. 1 the two vertical flats 21 of the outer member 15 are received closely within the vertical limbs 24A and can slide therein for adjustment. Each limb 24A has a slot 24E therein through which passes a horizontal externally threaded stud 27 upon which is mounted a washer 28 and a pair of nuts 29.

Extending vertically upwards from the upper flat 21 of the outer member 15 is a further stud 30 again externally threaded and provided with similar nuts 31 and a washer 32. The stud 30 passes through an oversized hole 33 in the bridge 24B. Each inner end of the studs 27 and 30 is secured to the outer member 15 by welding as indicated at 34.

The mounting described and shown provides an extremely simple method of connection of a marine engine to bearers 41 in the hull. The brackets are connected by bolts 42 passing through the holes 24D to the hull bearer 41 and the engine 40 is provided with an appropriately prepared bracket connected to the pick-up bracket of the engine and having a 1 inch diameter bolt 44 (FIG. 1) which is received within the bore of the inner member 10 of the mounting. The adjustment of the mounting for correct height is readily achieved by slackening the nuts 29 and adjusting the height of the outer member 15 by means of the nuts 31 prior to re-clamping of the nuts 29.

The mounting described and shown has a very low profile and is extremely suitable for the low mounting of a marine engine, for example in a marine cabin cruiser or yacht where it is desired to achieve an extremely low engine height in order that maximum height be available above the engine, for example for cabin or other accommodation. The type of bracket used makes it unnecessary to cut holes in bearers which may form important structural sections of the hull, but the adjustment obtainable is highly suitable for ensuring a linear transmission line from the engine for smoothest possible operation.

Whilst an annular intermediate rubber member 17 has been described together with a cylindrical inner member 10, in other circumstances the form of these members may vary. For example the inner member 10 may be rectangular in cross-section and may be merely connected to the outermember by a pair of side intermediate portions bonded to the inner and outer members and mounting the engine in shear. Alternatively, such vertical intermediate rubber sections may have short inward horizontal flanges at top and bottom positions. Such constructions provide a low vertical stiffness as compared with the complete annulus 17 described and shown in the drawings.

What I claim as my invention and desire to secure by Letters Patent is:

1. A flexible mounting comprising:
   a rigid inner member,
   an intermediate flexible layer formed in at least one part and positioned around the inner member,
   an outer member surrounding the flexible layer,
   a support member which has mounting surfaces which, when the mounting is in use, contact the surface to which the mounting is mounted,
   the support member also having opposed parallel walls which extend generally at right angles to the mounting surfaces of the support member, and between which the outer member is located,
   and clamping means for clamping the outer member to the support member at any selected one of various positions which are spaced apart along the parallel walls in the direction at right angles to the mounting surfaces of the support member,
   the rigid inner member having a bore which extends generally parallel to the parallel walls and to the mounting surfaces, for receiving a member which is to be supported while allowing rotational adjustment of the member within the bore.

2. A mounting as claimed in claim 1 in which the clamping means includes a pair of clamping devices one on each of the parallel walls and a third clamping device on a further wall which bridges the parallel walls and which extends perpendicular thereto.

3. A mounting as claimed in claim 2, in which each clamping device comprises a threaded stud secured to the outer member and passing through a slot in the support and carrying a nut engaging the support.

4. A marine installation comprising a boat having at least one engine bearer and an engine mounted on the bearer by means of a number of spaced flexible mountings each of which includes a rigid support including a pair of spaced substantially vertical walls connected by lower integral portions thereof to the engine bearer, upper parts of the vertical walls being interconnected by an integral substantially horizontal wall, each of the vertical and horizontal walls having a hole therein and each of the vertical and horizontal walls having an outer and an inner face around the margin of said hole, a rigid outer sleeve disposed in abutting relation to said inner faces of the vertical walls, said outer sleeve having an inner contact surface, three threaded studs being carried by the rigid outer sleeve and extending one through each of said holes, a nut carried by each of the studs and bearing against said outer faces of said walls, an intermediate flexible layer in contact with said inner contact surface of the rigid outer sleeve, and a rigid inner member connected to the engine and located within said intermediate flexible layer.

5. A marine installation comprising:
   a boat having at least one engine bearer, and an engine mounted on the bearer by means of number of spaced flexible mountings,
   each of said mountings having a rigid inner member with a generally horizontal bore which extends generally at right angles to the length of the bearer, and which receives a member connected to the engine to support part of the weight of the engine through the member, while allowing rotational adjustment of the member within the bore, an intermediate flexible layer formed in at least one part and positioned around the inner member, an outer member surrounding the flexible layer, a support having opposed substantially vertical parallel walls which extend generally at right angles to the length of the bearer, and between which walls the outer member is received, the support also having mounting surfaces by which it is mounted to the upper surface of the bearer, and clamping means for clamping the outer member to the support in any selected one of various positions spaced apart in the generally vertical direction along the parallel walls.

* * * * *